(12) United States Patent
Marzorati et al.

(10) Patent No.: US 12,197,719 B2
(45) Date of Patent: Jan. 14, 2025

(54) MASKED OVERLAY FOR CUSTOM REPOSITIONING OF INTERACTIVE OBJECTS ON A TOUCHSCREEN OF A COMPUTING DEVICE

(71) Applicant: Kyndryl, Inc., New York, NY (US)

(72) Inventors: Mauro Marzorati, Lutz, FL (US); Jeremy R. Fox, Georgetown, TX (US); Trudy L. Hewitt, Cary, NC (US); Christian Compton, Austin, TX (US)

(73) Assignee: Kyndryl, Inc., New York, NY (US)

( * ) Notice: Subject to any disclaimer, the term of this patent is extended or adjusted under 35 U.S.C. 154(b) by 40 days.

(21) Appl. No.: 17/588,814

(22) Filed: Jan. 31, 2022

(65) Prior Publication Data
US 2023/0244376 A1 Aug. 3, 2023

(51) Int. Cl.
*G06F 3/04886* (2022.01)
(52) U.S. Cl.
CPC .................. *G06F 3/04886* (2013.01)
(58) Field of Classification Search
None
See application file for complete search history.

(56) References Cited

U.S. PATENT DOCUMENTS

| | | |
|---|---|---|
| 6,300,948 B1 | 10/2001 | Geller et al. |
| 7,197,715 B1 | 3/2007 | Valeria |
| 9,535,562 B2 | 1/2017 | Mehringer et al. |
| 10,198,154 B2 | 2/2019 | Shuster et al. |
| 2003/0214536 A1* | 11/2003 | Jarrett ............... G06V 30/1423 715/831 |
| 2006/0136829 A1 | 6/2006 | Abbar et al. |
| 2009/0049389 A1 | 2/2009 | Kuzmanovic |
| 2009/0265661 A1 | 10/2009 | Shuster |
| 2009/0270078 A1* | 10/2009 | Nam ................ H04M 1/72406 455/566 |

(Continued)

FOREIGN PATENT DOCUMENTS

WO 2010144201 12/2010

OTHER PUBLICATIONS

Anonymous, "IBM iX is your global business design partner", https://www.IBM.com/services/ibmix, accessed Jan. 25, 2022, 11 pages.

(Continued)

*Primary Examiner* — Asher D Kells
*Assistant Examiner* — Gabriel Mercado
(74) *Attorney, Agent, or Firm* — Dan Housley; Andrew M. Calderon; Calderon Safran & Wright P.C.

(57) ABSTRACT

A method includes: receiving, by a computing device, user input defining a first location of a touchscreen of the computing device, the touchscreen displaying a user interface (UI) of an application; receiving, by the computing device, user input defining a second location of the touchscreen of the computing device; identifying, by the computing device, an interactive object of the UI at the first location; creating, by the computing device, an overlay including a copy of the interactive object and a masking object, the copy of the interactive object being at the second location and the masking object being at the first location; and causing, by the computing device, the touchscreen to display an output including the overlay superimposed over the UI.

20 Claims, 6 Drawing Sheets

(56) References Cited

U.S. PATENT DOCUMENTS

| | | | |
|---|---|---|---|
| 2011/0285636 A1* | 11/2011 | Howard | G06F 3/04883 |
| | | | 345/173 |
| 2014/0309861 A1* | 10/2014 | Lind | G06F 9/451 |
| | | | 715/745 |
| 2016/0231911 A1 | 8/2016 | Godsey | |
| 2018/0225019 A1* | 8/2018 | Xie | G06F 3/04886 |
| 2019/0073003 A1* | 3/2019 | Xu | G06F 1/1692 |
| 2020/0050974 A1 | 2/2020 | Yip | |
| 2020/0104148 A1* | 4/2020 | R | G06F 9/453 |
| 2020/0267324 A1* | 8/2020 | Liu | H04N 23/631 |
| 2022/0121357 A1* | 4/2022 | Kim | G06F 3/04847 |
| 2022/0147437 A1* | 5/2022 | Chen | G06F 3/04842 |
| 2022/0414724 A1* | 12/2022 | Haro | G06N 20/00 |
| 2023/0230013 A1* | 7/2023 | Bonnington | G06Q 10/06395 |
| | | | 705/7.41 |

OTHER PUBLICATIONS

Anonymous, "Mobile experiences for everyone", https://www.IBM.com/services/ibmix/mobile/, accessed Jan. 25, 2022, 5 pages.
Wong, "New version of Google Keyboard has a useful one-handed texting mode", https://mashable.com/2016/05/02/google-keyboard-android-update-one-hand-use/, Mashable, May 2, 2016, 8 pages.

* cited by examiner

MASKED OVERLAY FOR CUSTOM REPOSITIONING OF INTERACTIVE OBJECTS ON A TOUCHSCREEN OF A COMPUTING DEVICE

BACKGROUND

Aspects of the present invention relate generally to computing devices and, more particularly, to a masked overlay for custom repositioning of interactive objects on a touchscreen of a computing device.

Most mobile computing devices, such as smartphones and tablet computers, include a touchscreen. A touchscreen (or touch screen) is the assembly of both an input (e.g., a touch panel) and output (e.g., a display) device. The touch panel is normally layered on the top of an electronic visual display of an information processing system and can comprise a resistive or a capacitive sensing system, for example. The display is often an LCD (liquid-crystal display) but may incorporate other technologies such as OLED (organic light-emitting diode).

Mobile applications (apps) that run on mobile computing devices commonly include interactive objects that are displayed on the touchscreen, e.g., in a user interface (UI) displayed by the touchscreen. These interactive objects can include and buttons, sliders, rockers, keyboards, and wheels, for example. A user can provide input via the interactive object (e.g., by touching the interactive object on the touchscreen with their finger or thumb) to control a function of the mobile application. For example, a UI of a camera application may include a button that a user can touch to take a picture and a slider or wheel that the user can manipulate via touch to adjust the zoom. In another example, a UI of a video game application may include a first button that a user can touch to cause an avatar in the UI to jump, a second button the user can touch to cause the avatar to duck, and a rocker the user can touch to cause the avatar to move forward, backward, left, or right on the UI.

SUMMARY

In a first aspect of the invention, there is a computer-implemented method including: receiving, by a computing device, user input defining a first location of a touchscreen of the computing device, the touchscreen displaying a user interface (UI) of an application; receiving, by the computing device, user input defining a second location of the touchscreen of the computing device; identifying, by the computing device, an interactive object of the UI at the first location; creating, by the computing device, an overlay comprising a copy of the interactive object and a masking object, the copy of the interactive object being at the second location and the masking object being at the first location; and causing, by the computing device, the touchscreen to display an output comprising the overlay superimposed over the UI.

In another aspect of the invention, there is a computer program product including one or more computer readable storage media having program instructions collectively stored on the one or more computer readable storage media. The program instructions are executable to: detect a user is having difficulty reaching an interactive object included in a user interface (UI) displayed by a touchscreen of a handheld computing device; suggest that the user change a location of the interactive object; in response to the suggesting, receive user input defining a first location of the touchscreen; receive user input defining a second location of the touchscreen; identify an interactive object of the UI at the first location; create an overlay comprising a copy of the interactive object and a masking object, the copy of the interactive object being at the second location and the masking object being at the first location; and cause the touchscreen to display an output comprising the overlay superimposed over the UI.

In another aspect of the invention, there is system including a processor, a computer readable memory, one or more computer readable storage media, and program instructions collectively stored on the one or more computer readable storage media. The program instructions are executable to: detect a user is having difficulty reaching an interactive object included in a user interface (UI) displayed by a touchscreen of a handheld computing device; create an overlay comprising a copy of the interactive object and a masking object, the masking object and the interactive object being at a first location, and the copy of the interactive object being at a second location different than the first location; cause the touchscreen to display an output comprising the overlay superimposed over the UI such that the interactive object is hidden by the masking object, wherein a functionality of the interactive object is available via the copy of the interactive object

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
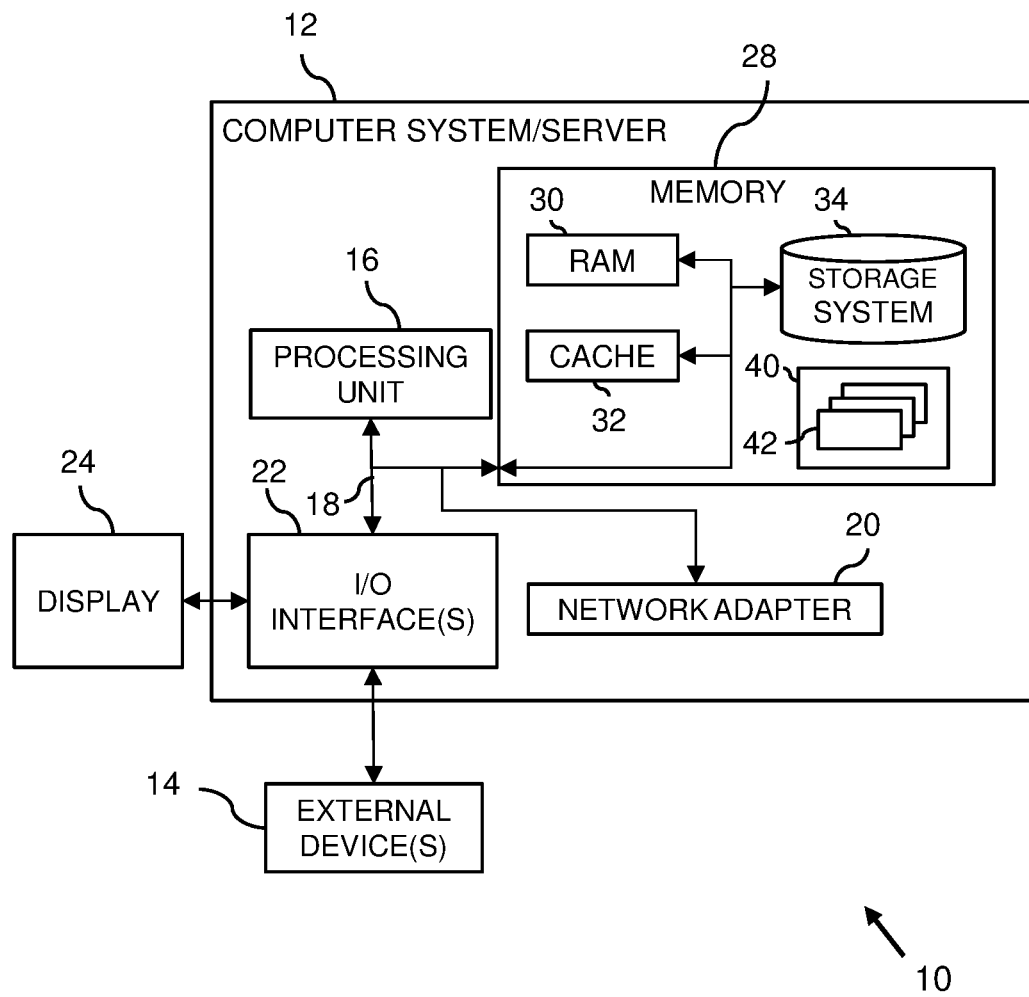
FIG. 1 depicts a computer infrastructure according to an embodiment of the present invention.

Aspects of the present invention relate generally to computing devices and, more particularly, to a masked overlay for custom repositioning of interactive objects on a touchscreen of a computing device. An interactive object of a mobile application is sometimes positioned on the touchscreen at a location that makes it difficult for the user to intact with the object. For example, a visual button that is an input in a UI of a video game application might be displayed on the touchscreen at a location that is difficult for a user to touch with their thumb when the user is holding the mobile computing devices with both hands while paying the game. Such difficulty in interacting with an interactive object on a touchscreen can depend on a combination of factors including: size of the mobile computing devices (i.e., different devices have different sized touchscreens ranging from 5 inches on a diagonal for a small smartphone to 14 inches on a diagonal for a large tablet); location of the interactive object on the touchscreen (e.g., different application UIs place objects at different locations in the area of the touchscreen); size of the user's hands and digits (i.e., different people have different size hands, fingers, and thumbs); and mobility of the user's hands and digits (i.e., different people have different flexibility and range of motion with the hands, fingers, and thumbs). Such difficulty in interacting with an interactive object can cause decreased satisfaction with an application because the user is unable to use the application in the intended manner. Such difficulty in interacting with an interactive object can also cause physical discomfort to the user if the user repeatedly contorts their hands and/or fingers to attempt to reach the interactive object that not is well positioned for them ergonomically.

Implementations of the invention provide a solution to this problem by allowing end users to create an overlay that allows the user to dynamically move interactive objects on their touch screen devices via the overlay. Implementations of the invention provide a UI practitioner and/or user experience (UX) practitioner the ability to develop higher quality user interfaces for iterative results.

Implementations of the invention provide a method that allows a user to move interactive objects (e.g., buttons in a UI, etc.) to a more ergonomic location on the screen and make it easier reach such objects that require repetitive motion/touch without having to position their fingers/hands in a way that may cause discomfort or pain. In this manner, each user's button-based UI will evolve with iterative feedback for ergonomic elegance.

Aspects of the invention address the above-noted problem by providing a system that permits a user to move interactive objects to user-defined locations in a UI displayed on a touchscreen, while maintaining the functionality of the interactive object with its associated application. In embodiments, the system is configured to: receive user input selecting an interactive object that is displayed at a first location on a touchscreen; receive user input defining a second location on the touchscreen; and generate an overlay to that displays the interactive object at the second location and while not displaying the interactive object at the first location. In embodiments, the first location is an original location of the interactive object, e.g., as defined by the application of which the interactive object is a part. In embodiments, the system maps the second location to the first location such that, while the user is using this particular application, a user input received at the second location is provided to the application as if the same user input were received at the first location. In embodiments, the overlay covers the first location with an image that is different than the interactive object so that the user does not see the interactive object at the first location and, optionally, does not communicate a user input received at the first location to the application. In this manner, the system permits a user to move the interactive object from a first (original) location to a second (user-defined) location displayed on a touchscreen, thereby improving the user's experience with the application. As such, implementations of the invention provide an improvement in the technical field of computing device user interfaces by providing a user the ability to move an interactive object to a location preferred by the user, thereby eliminating difficulty the user has in interacting with the interactive object at its original location in the user interface.

Aspects of the invention provide a method to personalize a masked overlay to alter input location on an existing user interface (UI), the method including: detecting and locating interactive elements that are rendered on a touch screen device, wherein the elements can include buttons, sliders, keyboards, rockers, etc.; copying the rendered button graphically to create a clone of the interactive element; and creating a clone of the interactive elements, and positioning them elsewhere on the screen. The creating can be in response to a voice command, a hand gesture, haptic input, etc. The creating can include masking the original input such that only the clone button will remain on the UI. The clone can be configured such that when the cloned element is interacted with, the system translates the interaction with the clone in a direct mapping to the original button in live time. The method may also include monitoring the use of the device and proactively recommend repositioning, wherein the monitoring is based on camera and/or accelerometer data to determine whether the user is having difficulty, and wherein the monitoring incorporates the interactions of the user with the UI to see if the user frequently messes up and redoes interactions. The method may further include cataloging the interactions to aid a design symbol knowledge corpus, which provides a personalized history of all interactions for future design element references. The method may additionally include dynamically and autonomously suggesting relocation of and/or a suggested location for the clone buttons, and accepting, by the user, suggested repositioning of masked/cloned UI elements to suit their needs. Aspects of the invention also provide a system and a computer program product that are configured to perform the method.

In embodiments, the system is capable of detecting and locating interactive objects that are rendered on a touch-screen device. Interactive objects can include buttons, sliders, keyboards, rockers, etc. In embodiments, the system is capable of copying a rendered object graphically to create a clone of the interactive object. In embodiments, users can select to create a clone of the interactive elements and position them elsewhere on the screen. The original object can be masked (not rendered) and only the clone button remains on the UI. In embodiments, when the cloned object is interacted with, the system translates the interaction with the cloned object in a direct mapping to the original object in live time. In embodiments, the system monitors the use of the device and proactively recommends repositioning an interactive object. Monitoring can be done by both camera and accelerometer data to determine whether the user is having difficulty. The monitoring may also incorporate the interactions of the user with the UI to see if the user frequently messes up and re-does interactions. In embodiments, the user may accept or modify a suggested repositioning of masked/cloned UI objects to suit their needs. In embodiments, the system catalogs the interactions to aid the design symbol knowledge corpus, which provides a personalized history of all interactions for future design element references. In embodiments, if a known user issue is occurring with how a user might be struggling with button interactions, the system can react autonomously with suggestions about proactive button movement for amelioration placement. In embodiments, the user has the ability to accept or reject any of the button movement positions pertaining to an evolving user interface experience.

It should be understood that, to the extent implementations of the invention collect, store, or employ personal information provided by, or obtained from, individuals (for example, data defining a user identify and/or interactions with a user interface), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
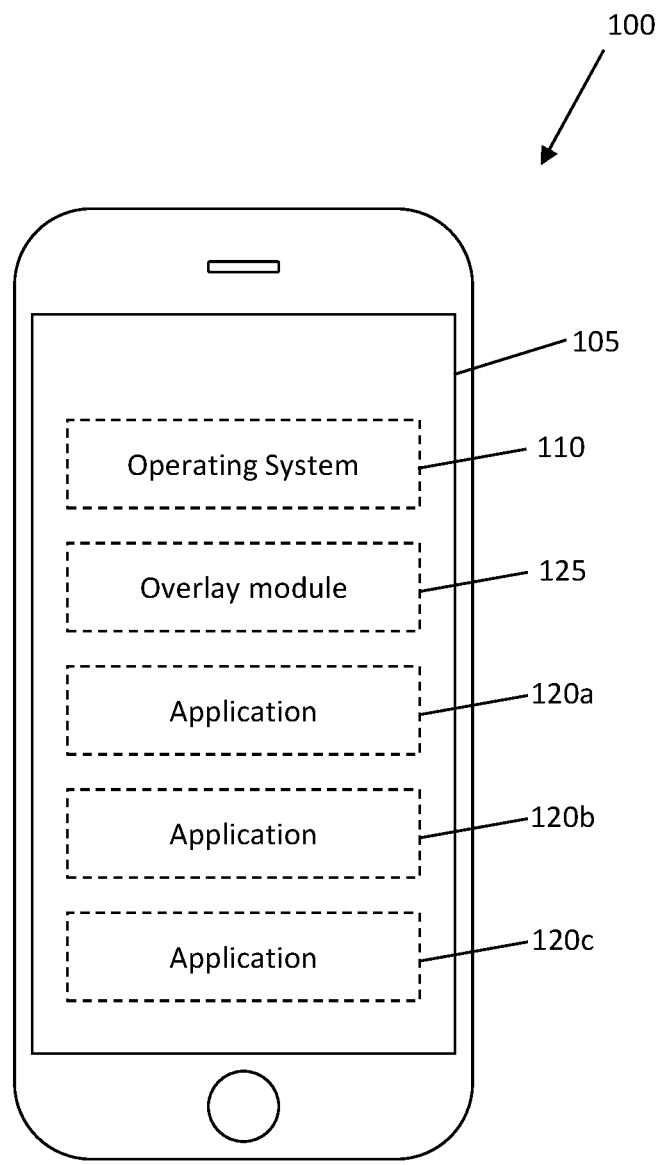
FIG. 2 shows a block diagram of an exemplary environment in accordance with aspects of the invention.

FIG. 2 shows a block diagram of an exemplary system in accordance with aspects of the invention. In embodiments, the system includes a computing device 100 that includes a touchscreen 105. In embodiments, the computing device 100 is a handheld computing device such as a smartphone or tablet computer, for example, and may comprise one or more elements of the computer system 12 of FIG. 1. The touchscreen 105 comprises an assembly of an input device (e.g., a capacitive touch panel) and a display device (e.g., an LCD or OLED display). In embodiments, the computing device 100 includes an operating system 110 and one or more applications 120a, 120b, 120c, each of which may comprise software stored in memory (such as memory 28 of FIG. 1). In implementations, the touchscreen 105 displays a user interface (UI) of a running application (e.g., application 120a). When a user touches the touchscreen 105 at a particular location with their finger or thumb, the touchscreen 105 generates a signal in response to the touch, and the operating system 110 determines a location (or locations) of the touch based on the signal and provides this information to the running application. The running application may then perform a function in response to this information received from the operating system 110 (e.g., depending on the location(s) of the touch on the touchscreen 105), such as taking a picture (e.g., in a camera application) or changing the visual display of the UI (e.g., in a video game application) in response to the user's touch input.

In embodiments, the computing device 100 comprises an overlay module 125, which may comprise one or more program modules such as program modules 42 described with respect to FIG. 1. The computing device 100 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the overlay module 125 receives data from the operating system 110, generates an overlay based on the data received from the operating system 110, and causes the computing device 100 to alter the display output by the touchscreen 105 based on the generated overlay. In embodiments, the UI displayed by the touchscreen 105 includes an interactive object at a first location, and the overlay includes a copy of the interactive object at a second location that is different than the first location. In embodiments, the data that the overlay module 125 receives from the operating system 110 includes data defining the first location and the second location. In an implementation, the overlay module 125 uses the data defining the first location to identify an interactive object in the UI at the first location. In this implementation, the overlay module 125 uses the data defining the second location to create an overlay including a visual copy of the identified interactive object at the second location. In embodiments, the overlay module 125 creates the overlay to include a masking object at the first location, the masking object having a different visual appearance than the identified interactive object. In this implementation, the overlay module 125 causes the overlay to be visually superimposed over the UI that is displayed by the touchscreen 105. For example, the overlay module 125 may provide data defining the overlay to the operating system 110, which may control the touchscreen 105 to output a combined visual display that equals the combination of the overlay visually superimposed over the UI of the application.

Figure 3:
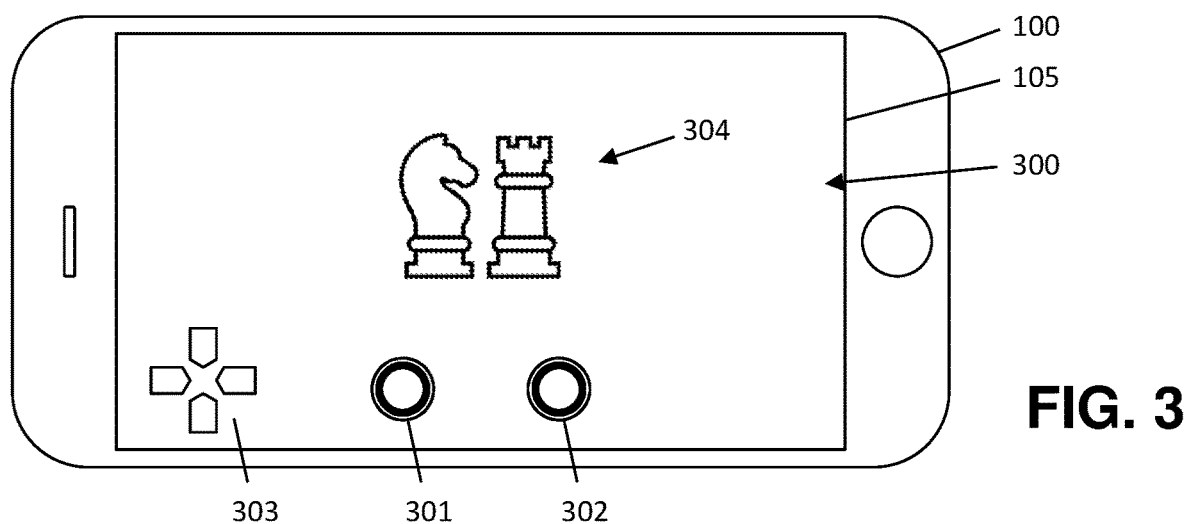
FIGS. 3-6 illustrate an exemplary use case in accordance with aspects of the invention.

FIGS. 3-6 illustrate an exemplary use case in accordance with aspects of the invention. FIG. 3 shows the touchscreen 105 of the computing device 100 displaying a UI 300 of a running application (e.g., application 120). In the example shown in FIG. 3, the UI 300 includes a first interactive object 301, a second interactive object 302, a third interactive object 303, and a graphic 304. In this example, the first interactive object 301 and second interactive object 302 are buttons, the third interactive object 303 is a rocker, and the graphic 304 is a video game (e.g., chess). In this example, the user decides that they want to move the location of the first interactive object 301 and second interactive object 302 because they are having difficulty reaching their thumbs to the locations of the first interactive object 301 and second interactive object 302.

Figure 4:
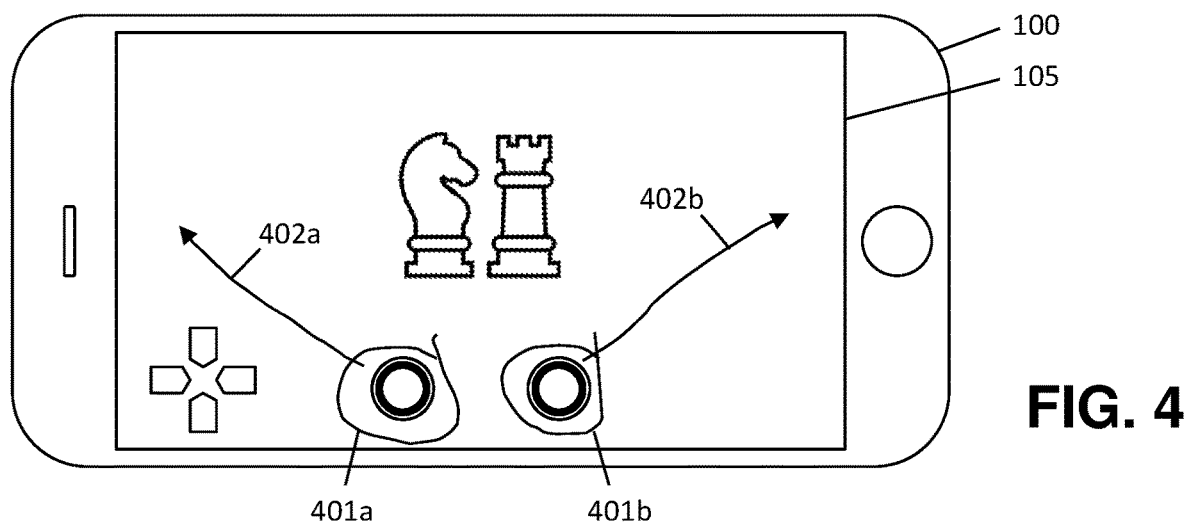

Accordingly, as shown in FIG. 4, for each of the interactive objects the user wishes to move, the user provides a first input that identifies the current location of the interactive object and a second input that defines the new location of the interactive object. In this example, for the first interactive object 301, the user provides a first input 401a that identifies the current location of the first interactive object 301 and a second input 402a that identifies a new location for the first interactive object 301. In this example, the first input 401a includes the user touching the touchscreen 105 and drawing a boundary around the first interactive object 301, and the second input 402a includes the user touching the touchscreen 105 and drawing a line from the boundary to the desired new location. Similarly, for the second interactive object 302, the user provides a first input 401b that identifies the current location of the second interactive object 302 and a second input 402b that identifies a new location for the second interactive object 302.

Figure 5:
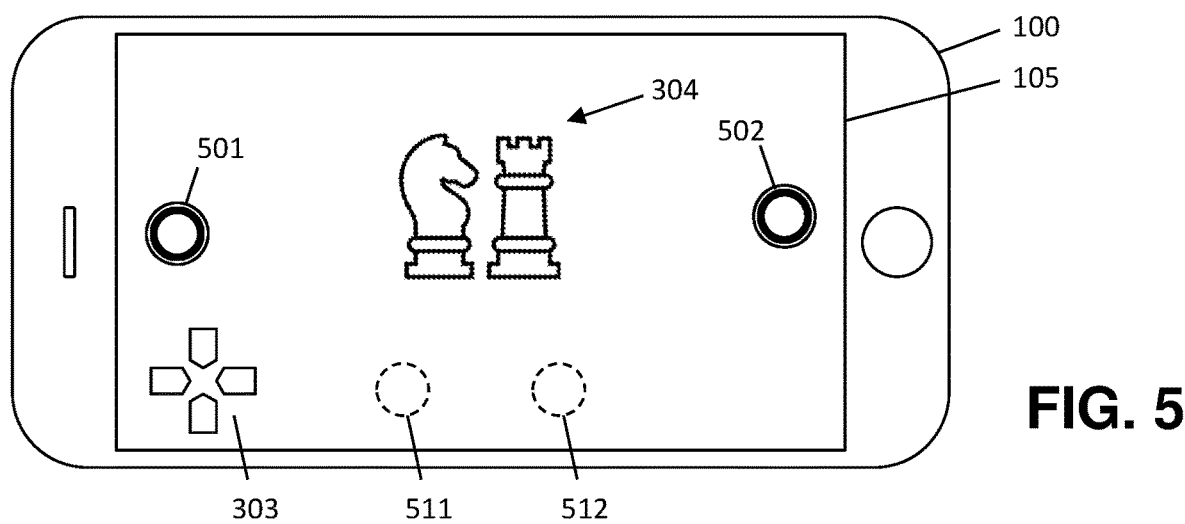

Continuing the description of this exemplary use case, FIG. 5 shows the computing device 100 changes the display output by the touchscreen 105 based on the user input from FIG. 4 to display copies 501, 502 the first and second interactive objects 301, 302 at the respective locations specified by the user inputs 402a, 402b. As also shown in FIG. 5, the computing device 100 changes the display output by the touchscreen 105 based on the user input from FIG. 4 to display masking objects 511, 512 covering the first and second interactive objects 301, 302. As shown in FIG. 5, the copies 501, 502 have the same visual appearance as the first and second interactive objects 301, 302, and the masking objects 511, 512 have a different visual appearance than the first and second interactive objects 301, 302. As further shown in FIG. 5, the rest of the UI 300 remains unchanged. For example, the third interactive object 303 and the graphic 304 are the same as they appear in FIG. 3.

Figure 6:
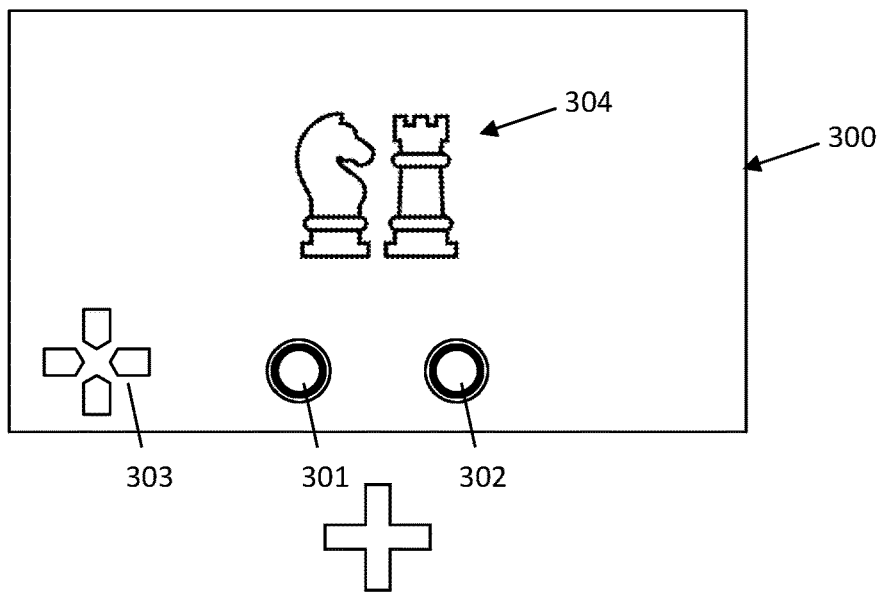
Figure 6:
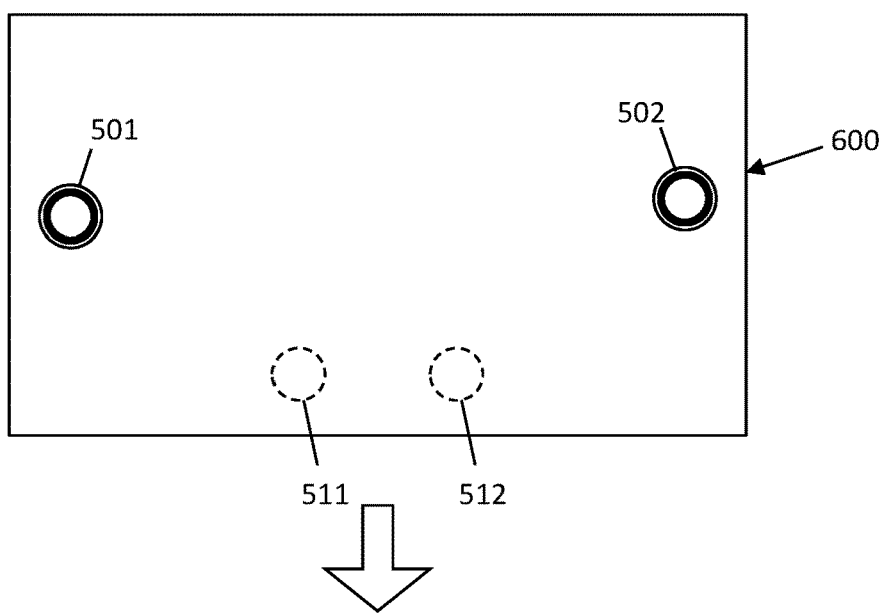
Figure 6:
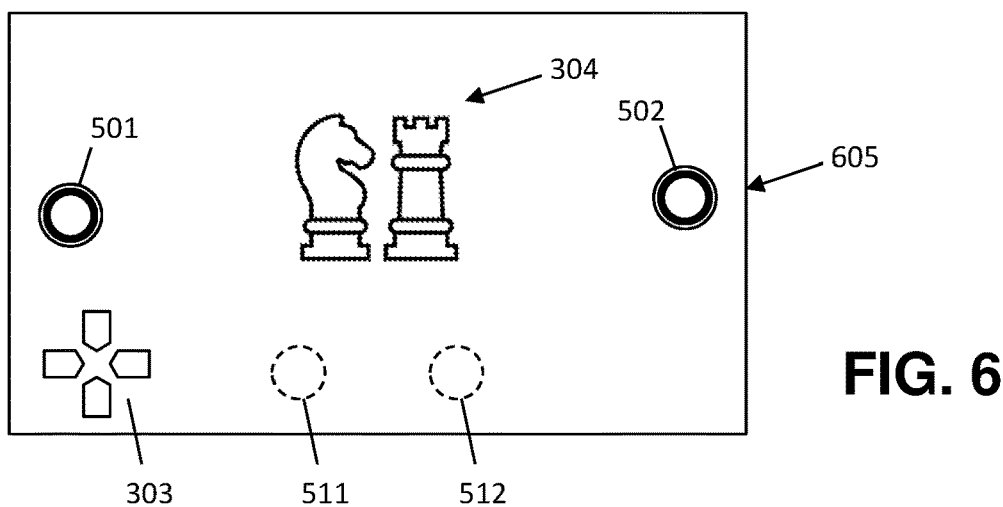

FIG. 6 illustrates the UI 300 of FIG. 3, the overlay 600 created by the overlay module 125 based on the user input at FIG. 4, and the output 605 of the touchscreen 105 that is shown in FIG. 5 and that is a combination of the overlay 600 superimposed on the UI 300. In embodiments, the overlay 600 is defined by data that defines the overlay objects (e.g., 501, 502, 511, 512 in this example) and their locations in the area of the touchscreen 105. In this manner, the computing device 100 may use the overlay 600 to change the display that is output by the touchscreen 105 to render the overlay objects (e.g., 501, 502, 511, 512 in this example) at the defined locations and superimposed over the UI 300 (e.g., covering portions of the UI 300).

In the example shown in FIGS. 3-6, the first interactive object 301 is a button that when touched by the user causes a first action in the UI 300, and the second interactive object 302 is a button that when touched by the user causes a second action in the UI 300. In this example, the overlay module 125 maps the location of the copy 501 to the location of the first interactive object 301. In this manner, when the operating system 110 detects a user touch input on the touchscreen 105 at the location of the copy 501, the operating system 110 uses the mapping to notify the application that the touch occurred at the location of the first interactive object 301. In this manner, the application performs the same function in response to the touch at the copy 501 as the application would have performed if the user had touched the first interactive object 301 in the UI 300, e.g., without the overlay present. In embodiments, the system performs a similar type of mapping for other copies and original interactive objects (e.g., such as copy 502 and second interactive object 302 in this example). In this manner, the copies (e.g., 501, 502) provide the same touch-based functionality in the application as do the original interactive objects (e.g., 301, 302), but at different locations relative to the original interactive objects. Additionally, for interactive objects that are not selected and moved by the user, their location and functionality remain unchanged. In the example shown in FIGS. 3-6, the third interactive object 303 remains unchanged between FIG. 3 and FIG. 5.

In accordance with an aspect of the invention, the user manually initiates changing the location of the interactive object in the display. The manual initiation may be by voice prompt, gesture, or audio prompt, for example. In one example, the overlay module 125 is configured to prompt the user to provide the first input (e.g., input 401a) in response to the user uttering a predefined word or making a predefined gesture. The predefined word and/or predefined gesture may be configurable parameters that the user may define in settings.

In accordance with another aspect of the invention, the system automatically prompts the user to change the location of the interactive object in the display based on sensor data of the computing device 100. In embodiments, the overlay module 125 stores historic sensor data that defines a situation in which the user is having difficulty reaching an interactive object. The sensor data may be one or more of camera data, gyroscope data, and accelerometer data collected by these various types of sensors in the computing device 100. In this embodiment, the overlay module 125 pulls real time data from these sensors in the computing device 100 and compares the real time sensor data to the stored historic sensor data. In this example, if the overlay module 125 determines that the real time sensor data is sufficiently similar to the stored historic sensor data (based on this comparing), then the overlay module 125 causes the computing device 100 to ask the user (e.g., via a pop-up message displayed by the touchscreen 105) whether the user would like to change the position of one or more interactive objects in the UI of this application. In this example, determining sufficiently similar may comprise determining a similarity score between the real time sensor data and the stored historic sensor data and comparing the similarity score to a predefined threshold value, where a similarity score that equals or exceeds the threshold value indicates that the data is sufficiently similar.

Implementations of the invention also provide for autonomous ergonomic infusion. In embodiments, the overlay module 125 is configured to interpret sensor data (e.g., camera or accelerometer data) as the user stretching their hand. Based on this, the overlay module 125 is configured to automatically move an interactive object to be more ergonomically placed.

In accordance with aspects of the invention, in response to receiving the first user input (e.g., user input 401a), the overlay module 125 identifies the interactive object at the location of the first user input using image processing. In one example, the overlay module 125 uses computer vision to identify the interactive object in the UI 300. An example of a computer vision technique is edge detection which automatically identifies visual boundaries between displayed objects. Implementations of the invention are not limited to using computer vision (generally) and/or edge detection (specifically), and other image processing techniques may be used to identify the interactive object in the UI at the location of the first user input.

In accordance with aspects of the invention, the overlay module 125 creates the copy (e.g., copy 501) of the interactive object (e.g., interactive object 301) using image processing. In one example, the overlay module 125 uses image copying to make a visual copy of the interactive object from the UI after the interactive object is identified in the UI.

In accordance with aspects of the invention, the overlay module 125 creates the masking object (e.g., masking object 511) using image processing. In one example, the overlay module 125 uses color analysis to determine a color adjacent to or around the interactive object at the location of the first user input in the UI, and creates the masking object to have the same color or a similar color by using a color fill process, for example.

In accordance with aspects of the invention, the overlay module 125 stores data defining an overlay for a particular application. In embodiments, when the user closes the application and then subsequently opens the application at a later time, the overlay module 125 automatically applies the overlay to the UI of the application. In this manner, the system automatically provides the overlay to the user. In further aspects, the overlay module 125 stores different overlays for different applications. In this manner, the system automatically provides a respective one of plural saved overlays to the user depending on which application is running. In this manner, a user may define different overlays for different applications, and the system saves the overlays for each application and re-applies the appropriate saved overlay the next time the user opens one of the applications. In even further aspects, the overlay module 125 stores different overlays for different users in a single application on the computing device 100. In this example, the computing device 100 is shared by two different users, and each of the users defines their own respective overlay for a particular application (e.g., a game that both users play at different times on the computing device 100). In embodiments, in response to a user opening an application on the computing device 100, the overlay module 125 determines which user is using the computing device 100 and applies the saved overlay that is associated with the determined user for the particular application. The computing device 100 may utilize user identification tools (e.g., fingerprint, typed or spoken credentials, face identification, etc.) to determine the current user for this purpose.

In this manner, implementations of the invention provide for reusability of saved overlays based on a user profile. Over time a user is likely to develop several overlays for different applications and/or situations. In an embodiment, the system leverages previously created overlays to be reused by saving them in a library with use-tag association (e.g., number of hands used, portrait/landscape orientation, day/night conditions, indoor/outdoor, etc.). The saving of overlays enables application affinity (e.g., reusing a same saved overlay in two different application) or conditional affinity (e.g., saving two different overlays for a same application depending on the different users or different conditions) with optional programmatic overlay activation.

In accordance with aspects of the invention, the overlay module 125 permits a user to modify a saved overlay to move an interactive object to another location. For example, a user may provide input to re-position a button in a camera application UI because it is difficult for the user to touch the button in its original location when the user is holding the computing device 100 in one hand while taking a selfie. In this example, the system creates and saves an overlay for this user in this application. In this example, the user utilizes the application with the saved overlay for a period of time (e.g., a few days) and decides that they are still having difficulty touching the button even in the new location defined by the overlay. In this example, the user provides input to the system to re-position the button again, to another location. In this example, because the original button is masked by the overlay, the user's first input (e.g., similar to input 401a) is used to identify the copy of the button shown in the overlay, and the user's second input (e.g., similar to input 402a) is used to define the new location of the copy in the overlay. The system then saves the overlay to have the copy at the newly defined location and, the next time the user opens the application, the revised overlay is applied, such that the copy is shown at the most recently defined location. In this manner, the user may iteratively refine their saved overlay for a particular application.

Implementations of the invention also provide enhanced security. Using sound and triangulation technologies, hackers can tell what a person is typing (e.g., based on keyboard sounds, where the user taps the touchscreen, etc.). A user may utilize embodiments of the invention to scramble the letters in the standard keyboard to prevent people from successfully determining what they type.

Figure 7:
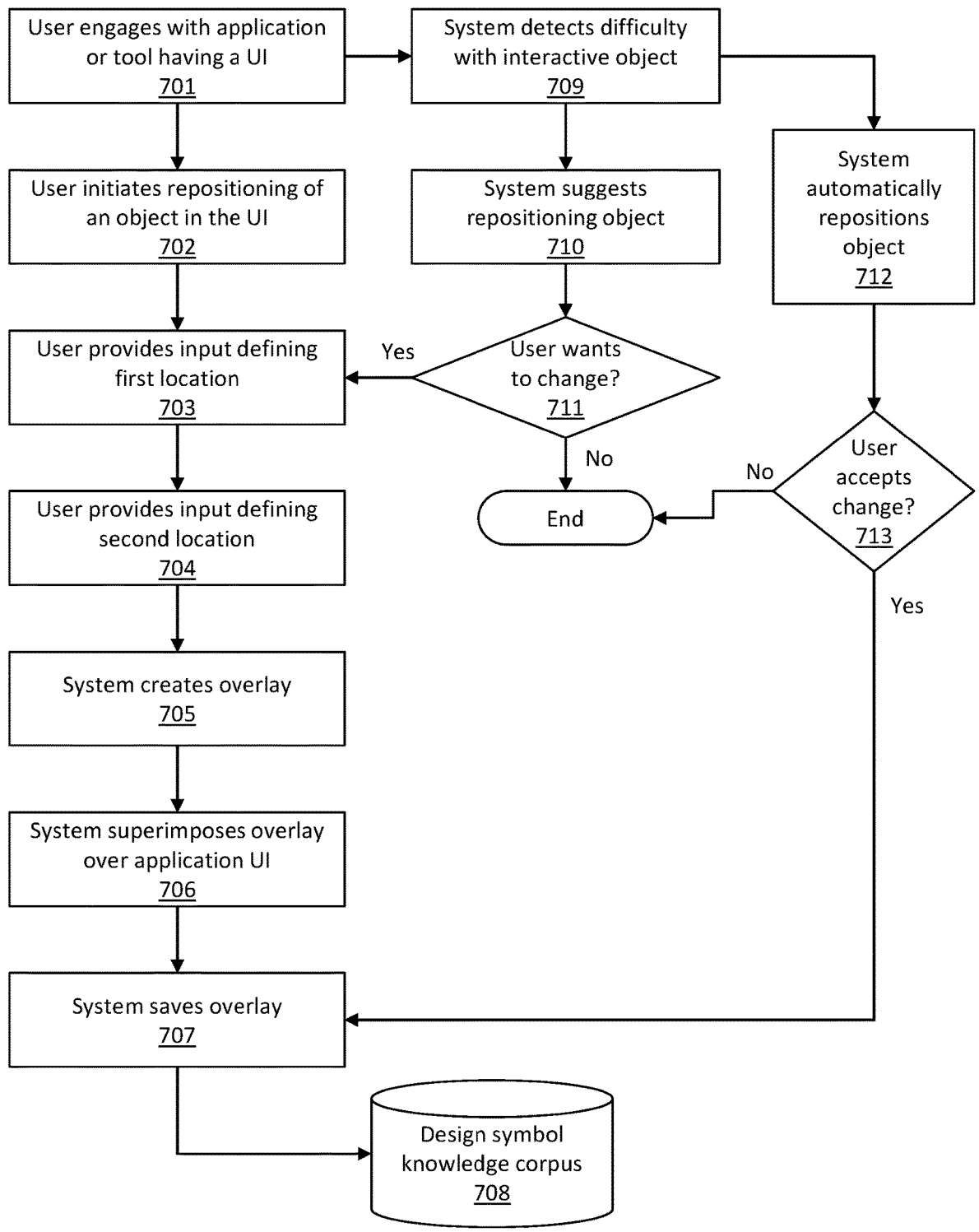
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 2 and are described with reference to elements depicted in FIGS. 2-6.

At step 701, a user engages with an application (e.g., application 120a) or tool on computing device 100. The application or tool has a user interface (e.g., UI 300) that is displayed on the touchscreen 105. A first path of the process begins at step 702 where the user manually initiates repositioning of an interactive object included in the UI and displayed on the touchscreen 105, e.g., using a voice input or gesture. At step 703, the user provides a first input (e.g., input 401a) that defines a first location, the first location corresponding to a current location of the interactive object (e.g., first interactive object 301) as displayed on the touchscreen 105. At step 704, the user provides a second input (e.g., input 402a) that defines a second location, the second location corresponding to a new (repositioned) location for the interactive object as displayed on the touchscreen 105. At step 705, the system creates the overlay. For example, and as described with respect to FIGS. 2-6, the overlay module 125 creates an overlay (e.g., overlay 600) that includes a copy of the interactive object (e.g., copy 501) and a masking object (e.g., masking object 511). At step 706, the system superimposes the overlay over the application UI. For example, and as described with respect to FIG. 6, the overlay module 125 may provide data defining the overlay 600 to the operating system 110, which may control the touchscreen 105 to output a combined visual display 605 that equals the combination of the overlay 600 visually superimposed over the user interface 300 of the application. At step 707, the system saves the overlay, e.g., to a design symbol knowledge corpus 708.

A second path of the process begins at step 709 where the system detects the user is having difficulty with an interactive object in the UI. For example, and as described previously, the system may make such a detection based on sensor data of the computing device 100. At step 710, the system suggests repositioning the interactive object from step 709, e.g., by asking the user (e.g., via a pop-up message displayed by the touchscreen 105) whether the user would like to change the position of one or more interactive objects in the UI. At step 711, the system determines whether the user wants to change the position of one or more interactive objects in the UI, e.g., by receiving user input that defines a yes or no answer to the suggestion of step 710. In response to determining at step 711 that the user does not want to change the position of an interactive object, then the process ends. In response to determining at step 711 that the user does want to change the position of an interactive object, then the process proceeds to step 703 and continues as already described in the first path.

A third path of the process begins at step 712 where the system automatically repositions an interactive object as displayed on the touchscreen 105 as a suggestion for the user. In embodiments, the overlay module 125 automatically creates an overlay that changes the position of the interactive object that was associated with the difficulty at step 509. In embodiments, the overlay module 125 determines the position of the copy based on positions of copies in one or more other overlays associated with this user. In embodiments, the overlay module 125 causes the touchscreen to automatically superimpose the overlay over the UI, and to then ask the user if they wish to accept the change. At step 713, the system determines whether the user wants to accept the change, e.g., by receiving user input that accepts or rejects the overlay created and superimposed at step 712. In response to determining at step 713 that the user does not want to accept the change, then the system deletes the overlay and reverts to the original UI without the suggested overlay. In response to determining at step 711 that the user does want to accept change, then the process proceeds to step 707 and continues as already described in the first path.

Figure 8:
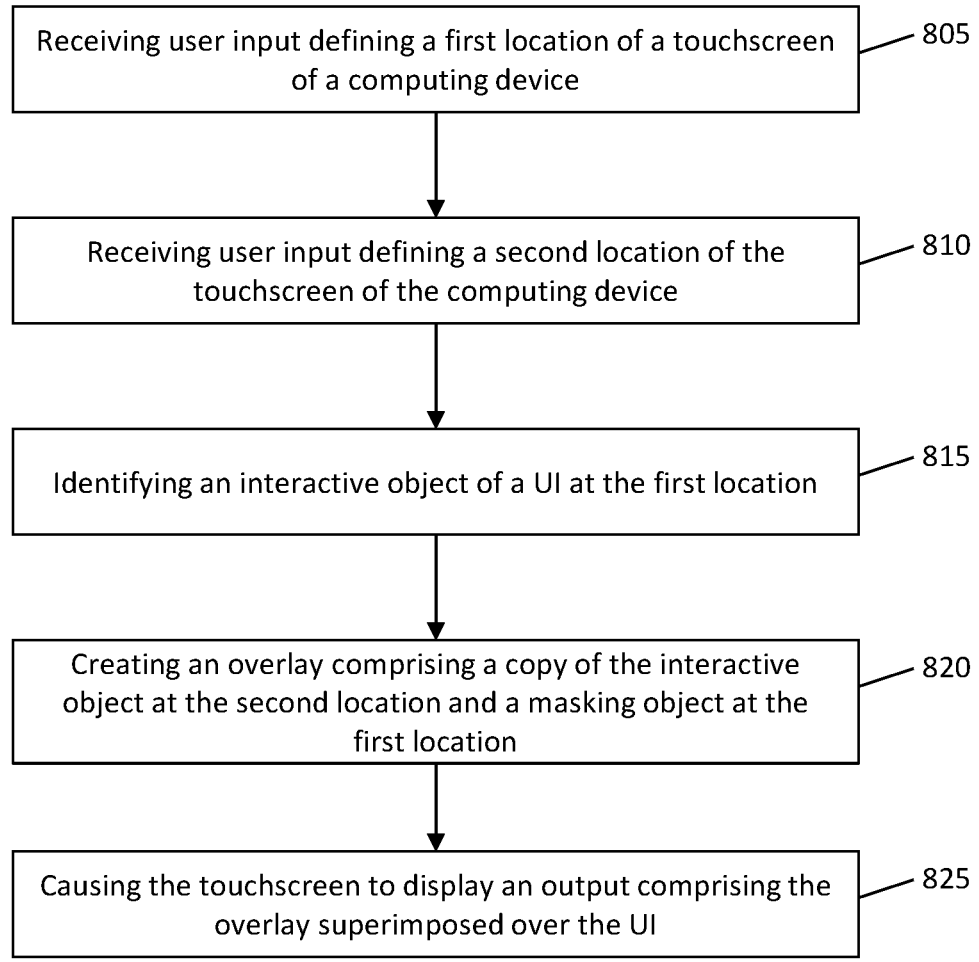
FIG. 8 shows a flowchart of an exemplary method in accordance with aspects of the invention.

FIG. 8 shows a flowchart of an exemplary method in accordance with aspects of the present invention. Steps of the method may be carried out in the environment of FIG. 2 and are described with reference to elements depicted in FIG. 2-6.

At step 805, the system receives user input defining a first location of a touchscreen of the computing device. In embodiments, and as described with respect to FIGS. 2-6, the touchscreen 105 displays a user interface (UI) of an application running on the computing device 100, and the user touches the touchscreen to indicate the first location, e.g., as at input 401a.

At step 810, the system receives user input defining a second location of the touchscreen of the computing device. In embodiments, and as described with respect to FIGS. 2-6, the user touches the touchscreen to indicate the second location, e.g., as at input 402a.

At step 815, the system identifies an interactive object of the UI at the first location. In embodiments, and as described with respect to FIGS. 2-6, the overlay module 125 analyzes the portion of the UI that corresponds to the first location to identify a visual object at the first location. As described herein, the overlay module 125 may use object detection techniques such as computer vision including edge detection.

At step 820, the system creates an overlay comprising a copy of the interactive object and a masking object. In embodiments, and as described with respect to FIGS. 2-6, the copy of the interactive object is at the second location and the masking object is at the first location.

At step 825, the system causes the touchscreen to display an output comprising the overlay superimposed over the UI. In embodiments, and as described with respect to FIG. 6, the output 605 of the touchscreen 105 is a combination of the overlay 600 superimposed over the UI 300. In this manner, the masking object covers (e.g., occludes) the interactive object at the first location, and the copy is shown at the second location and has the same functionality as the interactive object. For example, if the interactive object is a button that causes the application to take a picture, then the copy of the interactive object is a clone of the button at a different location and that, when touched, causes the application to take a picture just the same as the interactive object does when the overlay is not applied.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, user input defining a first location of a touchscreen of the computing device, the touchscreen displaying a user interface (UI) of an application;
receiving, by the computing device, user input defining a second location of the touchscreen of the computing device;
identifying, by the computing device, an interactive object of the UI at the first location;
creating, by the computing device, an overlay comprising a copy of the interactive object and a masking object, the copy of the interactive object being at the second location and the masking object being at the first location,
wherein the copy of the interactive object at the second location is mapped to the interactive object of the UI at the first location, wherein user interaction with the copy of the interactive object at the second location is operable to cause the computing device to translate the user interaction in a direct mapping to the interactive object of the UI at the first location, thereby maintaining functionality of the interactive object with its associated application;
causing, by the computing device, the touchscreen to display an output comprising the masking object superimposed over the UI; and
saving the overlay, thereby enabling reuse.

2. The method of claim 1, wherein the mapping of the copy of the interactive object at the second location to the interactive object of the UI at the first location results in a functionality of the interactive object at the first location being available via the copy of the interactive object using the translating by the computing device.

3. The method of claim 1, wherein the masking object visually covers the interactive object at the first location.

4. The method of claim 1, further comprising:
automatically applying the saved overlay in response to opening the application on the computing device, wherein the saved overlay corresponds to the application.

5. The method of claim 4, further comprising:
receiving another user input indicating a new location of the copy of the interactive object; and
updating the saved overlay including the new location of the copy of the interactive object;
causing the touchscreen to display an output comprising the updated masking object superimposed over the UI; and
saving the updated overlay.

6. The method of claim 1, further comprising:
saving the overlay as a first overlay associated with a first user;
creating and saving a second overlay associated with a second user;
in response to the determining the first user is using the application on the computing device, automatically applying the first overlay; and
in response to the determining the second user is using the application on the computing device, automatically applying the second overlay.

7. The method of claim 1, further comprising:
saving the overlay as a first overlay associated with the application;
creating and saving a second overlay associated with another application on the computing device, the other application being different than the application;
automatically applying the first overlay based on the computing device running the application; and
automatically applying the second overlay based on the computing device running the other application.

8. The method of claim 1, further comprising:
detecting a user is having difficulty reaching the interactive object;
suggesting to the user, via the UI, to change a location of the interactive object.

9. The method of claim 8, wherein the detecting is based on sensor data of the computing device.

10. The method of claim 9, wherein the sensor data comprises data from a camera or an accelerometer.

11. The method of claim 8, wherein the detecting comprises comparing real time sensor data of the computing device to historic sensor data that indicates difficulty.

12. The method of claim 1, wherein:
the interactive object is one of plural interactive objects in the UI; and
other ones of the plural interactive objects are unaffected by the overlay.

13. The method of claim 1, wherein the user input defining the second location of the touchscreen comprises the user drawing a line from the first location to the second location.

14. The method of claim 1, wherein the user input defining the first location of the touchscreen comprises a user drawn shape around the interactive object, and the user input is received via the touchscreen; and
the identifying the interactive object comprises using object detection in the UI in an area defined by the shape.

15. A computer program product comprising one or more tangible computer readable storage media having program instructions collectively stored on the one or more computer readable storage media, the program instructions when executed on a computing device cause the computing device to:
- detect a user is having difficulty reaching an interactive object included in a user interface (UI) displayed by a touchscreen of a handheld computing device, wherein the detecting comprises comparing real time sensor data of the computing device to historic sensor data that indicates difficulty, the real time sensor data comprises real time data obtained from a camera and an accelerometer of the handheld computing device, and the historic sensor data comprises historic data of the camera and the accelerometer collected and stored by the handheld computing device;
- in response to the detecting, suggest that the user change a location of the interactive object;
- in response to the suggesting, receive user input defining a first location of the touchscreen;
- receive user input defining a second location of the touchscreen;
- identify an interactive object of the UI at the first location;
- create an overlay comprising a copy of the interactive object and a masking object, the copy of the interactive object being at the second location and the masking object being at the first location,
- wherein the copy of the interactive object at the second location is mapped to the interactive object of the UI at the first location, wherein user interaction with the copy of the interactive object at the second location is operable to cause the computing device to translate the user interaction in a direct mapping to the interactive object of the UI at the first location, thereby maintaining functionality of the interactive object with its associated application; and
- cause the touchscreen to display an output comprising the masking object superimposed over the UI.

16. The computer program product of claim 15, wherein:
the masking object visually covers the interactive object at the first location; and
the identifying the interactive object comprises analyzing a portion of the UI using computer vision to identify the interactive object in the portion of the UI.

17. The computer program product of claim 15, wherein the program instructions are executable to:
save the overlay for reuse; and
automatically apply the overlay in response to opening the application on the computing device.

18. The computer program product of claim 15, further comprising program instructions to:
store the real time sensor data and user overlay comprising the user input of the first location, the second location, and the identified interactive object of the UI at the first location as historic data for later reuse.

19. A system comprising:
a processor, a computer readable memory, one or more tangible computer readable storage media, and program instructions collectively stored on the one or more computer readable storage media, the program instructions when executed on the processor, cause the processor to:
- receive real time sensor data of a handheld computing device;
- detect a user is having difficulty reaching an interactive object included in a user interface (UI) displayed by a touchscreen of the handheld computing device, wherein the detecting comprises comparing the real time sensor data of the handheld computing device to historic sensor data that indicates difficulty, the real time sensor data comprises real time data obtained from a camera and an accelerometer of the handheld computing device, and the historic sensor data comprises historic data of the camera and the accelerometer collected and stored by the handheld computing device;
- create an overlay comprising a copy of the interactive object and a masking object, the masking object and the interactive object being at a first location, the copy of the interactive object being at a second location different than the first location, and the overlay being defined by data that defines the masking object, the copy of the interactive object, and their locations in the touchscreen,
- wherein the copy of the interactive object is mapped to the interactive object at the first location, wherein user interaction with the copy of the interactive object is operable to cause the handheld computing device to translate the user interaction in a direct mapping to the interactive object at the first location, thereby maintaining functionality of the interactive object with its associated application; and
- cause the touchscreen to display an output comprising the overlay superimposed over the UI such that the interactive object is hidden by the masking object, wherein a functionality of the interactive object at the first location is available via the copy of the interactive object using the translating by the handheld computing device.

20. The system of claim 19, further comprising instructions to:
store the real time sensor data and user overlay comprising the user input of the first location, the second location, and the identified interactive object of the UI at the first location as historic data for later reuse.

* * * * *